United States Patent [19]

Frick

[11] 4,171,643

[45] Oct. 23, 1979

[54] VORTEX SHEDDING FLOWMETER CONSTRUCTION

[75] Inventor: Roger L. Frick, Eden Prairie, Minn.

[73] Assignee: Rosemount Inc., Eden Prairie, Minn.

[21] Appl. No.: 887,503

[22] Filed: Mar. 17, 1978

Related U.S. Application Data

[63] Continuation-in-part of Ser. No. 864,828, Dec. 27, 1977, which is a continuation of Ser. No. 755,357, Dec. 29, 1976.

[51] Int. Cl.² .............................................. G01F 1/32
[52] U.S. Cl. .............................................. 73/194 VS
[58] Field of Search .................................... 73/194 VS

[56] References Cited

U.S. PATENT DOCUMENTS

| | | | |
|---|---|---|---|
| 3,572,117 | 3/1971 | Rodely | 73/194 |
| 3,693,438 | 9/1972 | Yamasaki et al. | 73/194 |
| 3,972,232 | 8/1976 | Miller et al. | 73/194 |
| 3,996,796 | 12/1976 | Adler | 73/194 |
| 4,088,020 | 5/1978 | Sgourakes | 73/194 |

*Primary Examiner*—Herbert Goldstein
*Attorney, Agent, or Firm*—Kinney, Lange, Westman & Fairbairn

[57] ABSTRACT

A vortex flowmeter having a flow obstruction body or vortex forming bar formed in a manner to provide enhanced generation of vortices across a wide range of Reynolds numbers of the fluid being measured. The bar includes projections adjacent the lateral edges thereof which tend to cause formation of vortices at the leading lateral edges with respect to the direction of flow and enhance the formation of such vortices along the surfaces extending generally parallel to the flow. Additionally, the flowmeter disclosed provides a mounting for a sensor which makes the device relatively insensitive to acceleration in the mounting structure or supporting pipe of the flowmeter.

17 Claims, 8 Drawing Figures

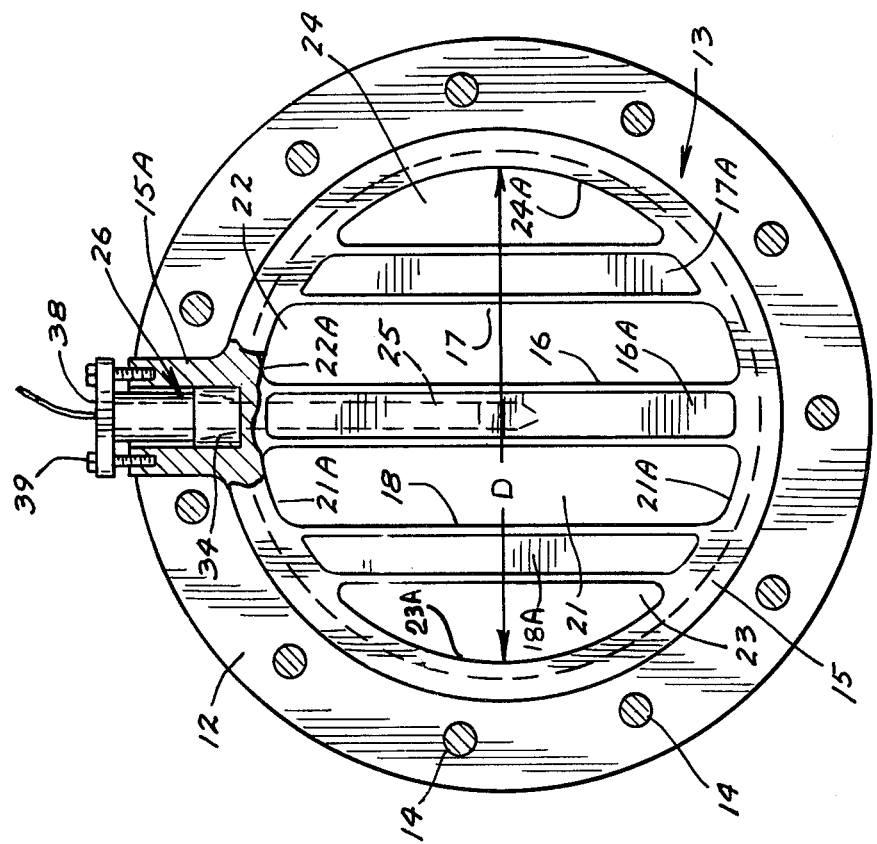
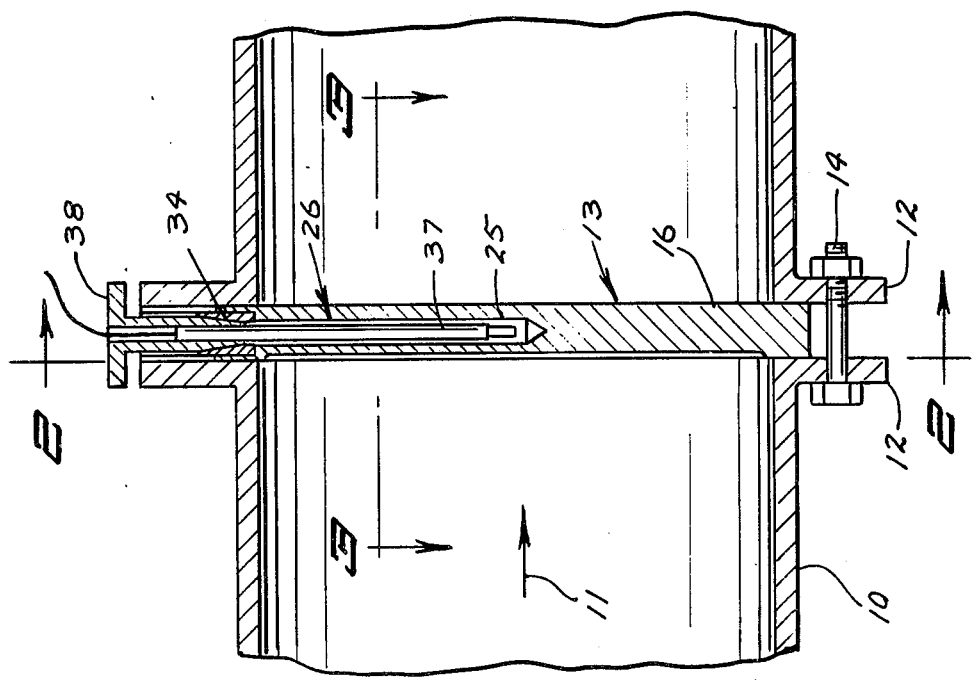

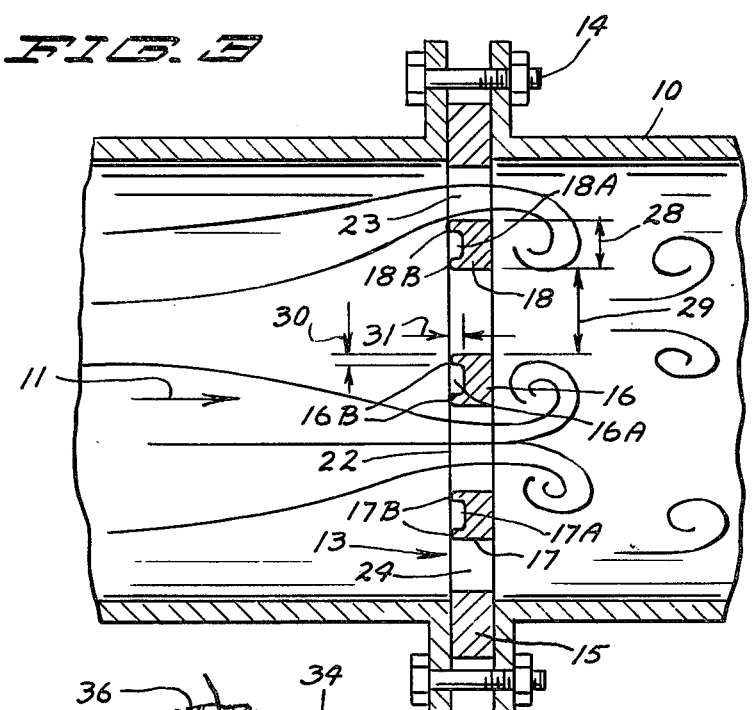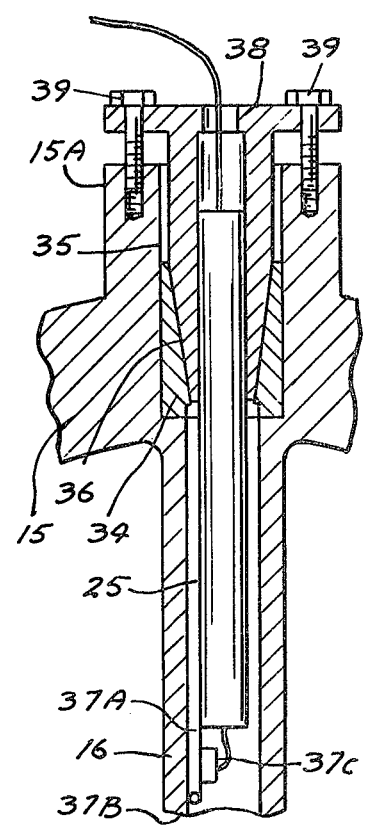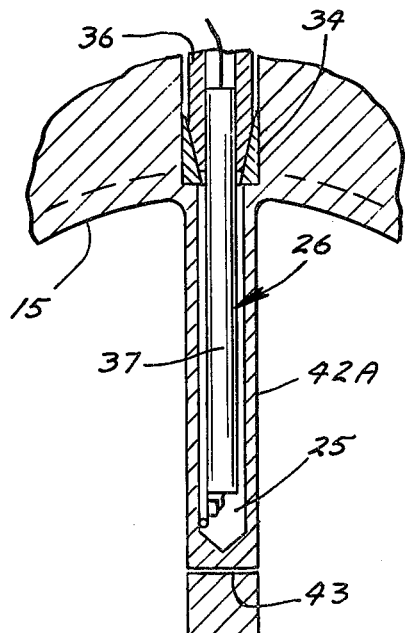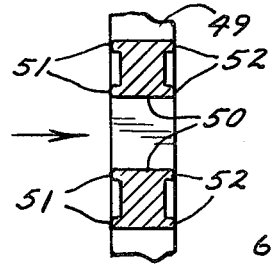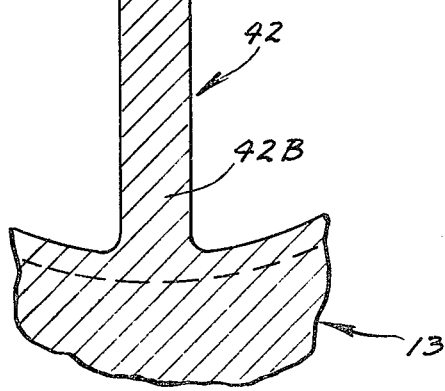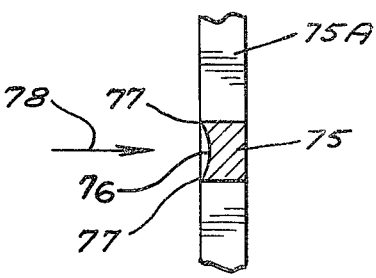

VORTEX SHEDDING FLOWMETER CONSTRUCTION

CROSS REFERENCE TO RELATED APPLICATION

The present application is a continuation-in-part of my copending U.S. patent application, Ser. No. 864,828 filed Dec. 27, 1977, which is a continuation of my prior U.S. patent application, Ser. No. 755,357, filed Dec. 29, 1976 for Vortex Shedding Flowmeter Assembly.

BACKGROUND OF THE INVENTION

1. Field of the Invention

The present invention relates to vortex shedding flowmeters having flow obstruction bodies to generate vortices and mountings for sensors used with such flowmeters.

2. Prior Art

In the prior art various flowmeters have been advanced which use vortex formation for flow sensing. For example, a T shape cross section flow obstruction bar is shown in U.S. Pat. No. 3,972,232, and it has a significantly narrower main body section than the head of the T.

Likewise, a flow sensitive body which includes an irregular cross section is shown in FIG. 8 of U.S. Pat. No. 3,116,639, and in other figures of this patent, such as in FIGS. 11 and 12, bodies having modified cross sections are illustrated. In each of the configurations shown in U.S. Pat. No. 3,116,639, the leading or upstream facing surface is contoured to provide for laminar flow. By way of contrast, in the present device, the upstream facing surface is provided with small projections which tend to cause the formation of the vortices along the lateral edges of the flow obstruction bars across a wide range of Reynolds numbers and with high response characteristics.

Additional T shaped flow obstruction bodies, and also bodies which include triangular cross section and other somewhat irregular sections, other than rectilinear or cylindrical are shown in U.S. Pat. No. 3,572,117. Again the particular shapes and operation are different from that shown in the present application.

Additional patents which show various flowmeter configurations are cited in my copending application identified above.

SUMMARY OF THE INVENTION

The present invention relates to a vortex shedding flowmeter which has flow obstruction bars configured with selected cross section features to enhance formation of vortices across a wide range of Reynolds numbers of the flowing fluid. The flowmeter as disclosed comprises a flat plate-type device which includes an outer rim or ring that holds the bars in place. Preferably the flow obstruction bars are arranged with a plurality of bars side by side spaced across the diameter of a flow pipe or conduit.

The cross sectional configurations of the flow obstruction bars or bodies have small protrusions or irregularities (called "trips" herein) on face portions of the bar facing in the direction of the flow. The protrusions tend to cause the flow impinging upon a bar to flow laterally, and then abruptly change direction as the diverted fluid turns to flow past the bar. The protrusions aid in the formation of the vortices along the lateral sides of the flow obstruction bars, (lateral sides means the sides of the bars which generally face laterally or transversely relative to the direction of flow through the conduit). Various forms of the invention disclosed all include a type of protrusion which after the flow has changed direction as it strikes the bar and separates in lateral direction cause an abrupt change of direction of more than 90° as the flow returns to the normal direction of flow through the conduit.

Various forms of the invention are disclosed, for example a concave recess in the forward facing surface of a generally rectilinear cross section bar causes the flow to change direction in a manner to enhance vortex formation.

The small protrusions may extend from the surfaces of rectangular cylindrical bars. In such a case, the protrusions will be generally radially extending fins or plates and would extend radially at an angle of about 30° to 45° to the right and to the left of a bisecting plane parallel to the flow axis. This positioning causes the flow impinging on the cylindrical bar to change direction at the fin or protrusion as the flow turns to flow past the bar setting up a tendency to "swirl" and thus enhance the formation of vortices.

While the cross sectional configurations of the bars shown can be used in flowmeters using single bars or multiple bars, the preferred form, as stated previously, is in a multiple bar flowmeter.

The sensor that is used to detect vibration of the bars caused by formation of vortices can be any desired type of sensor such as a semi-conductor strain gauge sensor. The sensor is mounted in the manner to minimize pipe or conduit vibration problems, and also to permit the sensor to be easily inserted and removed from the flowmeter without removing the flowmeter from the conduit with confidence that the sensor itself will not be improperly mounted and will be relatively uninfluenced by vibrations on the supporting pipe or conduit itself.

BRIEF DESCRIPTION OF THE DRAWINGS

FIG. 1 is a vertical sectional view through a typical flow conduit having a flow sensor made according to the present invention installed therein;

FIG. 2 is a sectional view taken on line 2—2 with parts in section and parts broken away;

FIG. 3 is a sectional view taken as on line 3—3 in FIG. 1;

FIG. 4 is an enlarged sectional view showing the sensor mounting in a center flow obstruction body modified from the sensor of FIG. 1;

FIG. 5 is a further enlarged fragmentary cross sectional view of the sensor and its mounting;

FIG. 6 is a sectional view taken as on the same line as FIG. 3 through a single flow obstruction bar showing a bi-directional flow sensing vortex forming bar made according to the present invention;

FIGS. 7 and 8 are sectional views taken substantially on the same line and in the same position as FIG. 6 showing modified forms of the flow obstruction bars made according to the present invention.

DESCRIPTION OF THE PREFERRED EMBODIMENTS

FIG. 1 shows a fluid carrying conduit or pipe 10 which is carrying fluid generally in the direction indicated by arrow 11 and which has a pair of flange type couplers 12, one on each of two conduit sections, which are spaced apart to receive and sandwich a vortex flowmeter plate assembly illustrated generally at 13. The flanges are held together with suitable coupling bolts 14, and they clamp and seal onto the vortex shedding flowmeter plate 13.

The flowmeter plate 13 in this form of the invention is made from a circular plate with orifices or flow apertures cut in the plate to define the cross bars. As can perhaps best be seen in FIG. 2, there is a perimeter or annular rim 15, and a center flow obstructing bar 16, a flow obstructing bar 17 adjacent a first side thereof, and a flow obstructing bar 18 adjacent a second side thereof. These bars or bodies 16, 17 and 18 are separated by suitable orifices or apertures (or slots) 21 and 22 on opposite sides of the center body 16 which are of equal size and shape, and orifices or apertures (or slots) 23 and 24 to the outside of the bars 17 and 18, which orifices 23 and 24 are also of equal shape and size. The outer edges of each of the orifices or apertures indicated at 21A, 22A, 23A, and 24A are part circular and these edges define the effective flow diameter D of the flowmeter assembly.

The flowmeter plate 13 is relatively thin in direction of the fluid stream 11, and the flow obstruction bodies or bars 16, 17 and 18 are formed generally rectilinear but with edge irregularities formed by recesses as shown and explained in connection with FIGS. 2 and 3. The bars 16, 17 and 18 are made to cause flow separation, causing vortices to be formed and shed from the bars along their side surfaces (the surfaces parallel to the flow direction).

A suitable motion sensor 26 is placed into a receptacle 25 and can be held in the receptacle in a suitable manner as will be explained. The sensor 26 is utilized for sensing vibrations of the center bar 16 caused by the formation and shedding of vortices as the fluid in the conduit flows past the bars.

When a plurality of spaced obstruction bodies are placed across the conduit and are commonly mounted to a rim as shown, the rim or plate can be slipped into position in place of a common orifice plate without modifying existing mounting members.

The center bar 16 is centered on a diametral line of the flow conduit, and the bars 17 and 18 are each spaced an equal distance laterally from the center bar and also an equal distance from the adjacent sides of the conduit.

It has been found that when a plurality of the obstruction bars or bodies such as 16, 17 and 18 which are transversely aligned across the conduit are utilized, the formation of vortices will tend to shift across the diameter of the conduit, so that primary or strong vortices are formed alternately along the sides of the bars as shown in my copending application Ser. No. 864,828. Note that no upstream or downstream bars or obstructions are used, but only the bars centered on a common plane perpendicular to the flow direction.

Briefly, the vortices are shown by the curled lines in FIG. 3. The vortices will switch back and forth so that vortices are formed between bars 16 and 18, and then between bars 16 and 17 alternately. Such vortices are shown in a downstream direction from the flow meter of the present invention in FIG. 3.

Strong vortices are formed along the sides alternately from the switching as disclosed in the previous application mentioned above. This of course causes vibration in the bars as also explained therein.

The plate 13 does have a tang portion indicated generally at 15A extending outwardly beyond the peripheral rims 15 of the orifice plate. The tang portion 15A is used for mounting the motion sensor assembly 26, which is mounted into receptacle 25 in the center bar or flow obstruction body 16. The receptacle or opening extends downwardly substantially to the midpoint of the bar, or approximately half-way across the conduit.

Adjacent the rim portion 15, the opening 25 has a larger bore portion 35 near its outer end. A split chuck member or holder 34 (in two or more sections) having an interior (inwardly facing) frusto conical surface is positioned against a shoulder formed at the inner end of bore 35 in the rim 15 of the plate. The sensor 26 has a probe portion 37 extending through a collet member 36, which has an exterior (outwardly facing) frusto conical surface that mates with and forms an interference or contact fit with the interior surface of chuck 34. The probe portion 37 is preferably made of a ceramic material. The collet 36 may be shrink fitted onto the probe portion 37 or may be slitted so that it will clamp onto the probe as the collet 36 and chuck 34 are forced together in a chucking action.

The probe portion 37 of the sensor 26 extends into the opening 25 and as shown a flexible, cantilevered sensing beam 37A is fixed to and projects from the end of the probe 37. The sensing beam carries a small nonconductive ball 37B which bears against the interior surface of opening 25 with a slight resilient force. The beam carries a strain gage 37C (a semiconductor strain gage is preferred) to sense deflection of the beam.

The center bar 16 vibrates laterally as the vortexes are shed, in a known manner. The beam 37B will flex, because probe 37 remains stationary, and the strain gage 37C delivers an output signal that indicates flow rate as a function of frequency of flexing. Suitable circuitry may be used for providing a useful output signal as a function of the signal from the strain gage.

The sensor 26 has an external fastening flange 38 at the upper end thereof. In the form shown, the flange 38 is attached to the collet 36 which carries the probe portion 37, and flange 38 and collet 36 are urged downwardly through the use of screws 39 threaded into the tang portion 15A of the flowmeter. The screws 39 are tightened to a desired level to exert a force on the collet 36 urging it tightly in position against the surface of chuck 34 and thus tightening collet 36 onto probe portion 37. Because the chuck 34 and collet 36 can be quite accurately machined in respect to the length of the probe portion 37 of the sensor and of the opening 25, the mating surfaces of chuck 34 and collet 36 serve to position the beam 37A at the end of the probe portion 37 within the opening 25 so that the end of the beam 37A does not engage the end of the opening 25.

The physical support between the flowmeter and the sensor assembly 26 is at the chuck member 34 and collet member 36. The sensor is clamped at the rim 15 rather than held at the vibrating bar or body itself. The use of the tightly engaged tapered surfaces cause the split collet to be forced against the interior surfaces of the bore 35 to properly position the probe portion 37 and beam 37A to sense vibrations of the flow obstruction body, and at the same time isolate the sensor assembly 26 and beam 37A from external shocks or vibrations in the conduit or pipe 10.

The rim 15 is clamped tightly to the conduit flanges, and the members 34 and 36 align with the rim at its mounting area. The support for the sensor at members 34 and 36 is rigid and thus the sensing beam 37A will not be flexed substantially by vibration of the flow conduit. The flowmeter is thus relatively insensitive to external shock and vibration but senses the vibrations of the bars caused by the vortices.

As a further feature, the threaded members 39 can be removed and the entire sensor assembly 26 can be pulled out easily through the external opening in the tang 15A. When replacing the sensor assembly the surfaces of members 34 and 36 will again mate and position the probe portion 37 of the sensor 26 properly in the aperture or opening 25 of the center flow obstruction body 16 to sense the vibrations that are set up in the body or bar.

The leads from the strain gage 37C may extend through openings in the probe portion 37 and flange 38.

A modified form of the sensor is shown in FIG. 4. In order to enhance the vibration of the center bar or flow obstruction body particularly at low flows, the bar 42, which corresponds to the bar or body 16 in FIGS. 1 through 3, has a slit formed by a narrow transverse cut indicated generally at 43 which separates the bar 42 into two sections 42A and 42B. The sections 42A and 42B are each fixed to the support rim 15 as in the previous form of the invention, and cantilever from the rim. The slit 43 is of sufficiently small size so that only a very small proportion of the fluid flows through this slit. Thus, there is no flow between the facing ends of the two bar portions 42A and 42B. However, the vibrations of the bar portions is enhanced and thus the sensor 26 will provide a greater signal and more easily sensed output, particularly at low flows, with the slit in the flow obstruction body.

In actual use, the slit has been made very narrow, in the range of 10 mils or so, in order to permit enhanced vibration of the flow obstruction body portions without permitting flow through the slit itself.

Referring to FIGS. 2 and 3, in particular, each of the bars or bodies 16, 17 and 18 has a cross section which includes a longitudinally extending recess indicated at 16A, 17A and 18A, respectively, on the side surface thereof facing the flow formed by pairs of small protrusions or protuberances 16B, 17B and 18B which are also called "trips" or "trip members" herein. The main portions of the flow obstruction bodies form generally evenly contoured and symmetrical bodies. The protrusions are at each of the forward side edges of each of the bars. The lateral side surfaces which face other bars are planar. The formed protrusions tend to cause the fluid that is flowing axially in the conduit or pipe as shown by arrow 11 to spread or move laterally to this flow direction as the fluid impinges the flow facing surface of the respective bars, and in so doing the protrusions or trips 16B, 17B and 18B tend to cause a swirling as the separated fluid flows over these protrusions and turns to flow along the transversely facing surface portion of the bars. The flow past the transversely facing surfaces is parallel to direction of arrow 11. The protrusions tend to set up a swirling action by causing a partial reversal of the direction of the fluid as the fluid moves past the protrusions and flow obstruction body, and enhance the formation of vortices along the facing lateral surfaces of the bars as shown in FIG. 3.

The bars 16, 17 and 18 are supported at the top and bottom on rim or ring 15, and will tend to vibrate transversely to the flow direction at a frequency depending upon rate of flow as indicated by formation of vortices. Ignoring the trip members 16B, 17 and 18B the flow obstruction bodies have main portions which have symmetrical rectangular cross sections about a bisecting plane parallel to the flow direction. The trips or protrusions adjacent the forward edges of the side surfaces of the bars (at the corners) are of size and shape sufficient to cause shedding of stronger vortices than a body of the size and shape of the main portion without the trip members. Also stronger vortices are formed with the trip than with a body of a size equal to the size defined by a body including the trips.

In the preferred embodiment shown in FIG. 3, assuming that the internal diameter of the flow opening is equal to "D", the spacing between the facing surfaces of bars 16 and 18 as shown at 29 is preferably 0.20D. The trip width shown in direction transverse to the flow direction as indicated at 30 is 0.007D. The height of the protrusions in direction parallel to the flow direction to be sensed is in the range of 0.015D. This dimension is indicated at 31. The width of the bars or bodies in direction transverse to the flow direction is preferably in the range of 0.085D. This dimension is indicated at 28. As shown dimension 30 is about 0.085 of the lateral width dimension 28. Related to the lateral width of the bar, the width and height of the protrusions (dimensions 30 and 31) preferably are not substantially greater than 0.1 times the transverse width 28 of the bars.

The small protrusions are kept narrow and not very high (in direction of flow) to regularly aid in the release or "tripping" of vortices along the side surfaces of the flow obstruction bodies. The protrusions project the desired amount from the adjacent surface portions of the flow obstruction bodies.

In FIG. 6, a typical bidirectional flow sensitive, flow obstruction bar or body is illustrated. In this particular instance, the flow obstruction bodies 50 are mounted on a rim or ring 49 as previously explained and each includes a first pair of surface irregularities or portions 51,51 at the lateral sides of the flow obstruction body adjacent one face surface. These small protrusions or trips 51,51 are identical to those shown on the bars of FIG. 3. Each of the flow obstruction bodies 50 has protrusions 52,52 at the edges of the oppositely facing surfaces. Thus, each body 50 is substantially symmetrical with respect to the plane of the mounting ring 49 and operates identically regardless of the direction of flow relative to the sensor. The protrusions or irregularities 51 and 52 cause enhanced generation of vortices along the side surfaces of the bodies as previously described.

In FIG. 8, a modified form of the invention is illustrated. In this particular form a flow obstruction bar or body 75 may be mounted in a rim or ring 75A alone or with additional bodies positioned as shown in FIGS. 2 and 3. The body 75 has a part cylindrical surface recess 76 which forms trips or protrusion edge portions 77,77 adjacent the lateral side edges of the body. The surface 76 is part circular cross section and extends along the longitudinal length of the flow obstruction body 75 a desired amount. Flow in this instance is in direction indicated by the arrow 78. The body 75 may also have a similar recess to that shown at 76 on the oppositely facing surface to provide bidirectional flow capabilities as well. The outer end portion 77 of the flow facing surface provides the protrusions forming trips to enhance vortex formation along the bars.

FIG. 7 is a modified cross section shape of a flow obstruction bar or body. In FIG. 7, a flow obstruction bar or body 60 is mounted in a ring or support 60A at its opposite ends as shown in FIGS. 2 and 3, and has small, narrow protrusions 61,61 extending laterally out beyond the lateral side surfaces 62,62 of the bar or body and at the flow facing end or surface of the bar. These protrusions 67 are quite narrow and short, and as flow moves in the direction as indicated by 63 it tends to separate, and flow sideways or laterally and then around the trips or protrusions 61,61. Thus the curling or swirling motion at the upstream corners of the lateral sides of the flow obstruction body enhances vortex generation. The trip members or protrusions are relatively narrow and short in relation to the transverse or upstream and downstream dimensions of the body, as shown. The size of the protrusions 61 is similar to protrusions 16B, 17B and 18B.

Flowing fluid moves laterally along the upstream backing surface of the bar 60 as it strikes the bar and thus curls back as it goes around the trips or protrusions 61, setting up a pattern that enhances vortex generation.

The bar 60 also may be made bidirectional by adding another pair of trips or protrusions at the other corners of the bar 60 to make the bar symmetrical relative to the plane of the mounting ring 60A, which plane bisects the bar 60 and is perpendicular to the flow direction.

In all forms of the invention, the trips or protrusions effectively cause change of direction of flow, which first tends to go toward the lateral sides of the bar or generally perpendicular to the normal direction of flow and then changes direction quickly at the side edges of the flow obstruction body to enhance vortex formation. A flow direction change over 90° is caused by each of the "trips" as the flow turns downstream past the bodies or bars. This tends to start early generation of a vortex.

The trips formed on the flow obstruction bodies extend substantially the entire length of the body itself from adjacent the ends where it is supported with respect to the annular ring or orifice plate. The length of the protuberances or trips described can be varied to suit existing conditions.

The mounting members for the sensor assembly are annularly aligned with the flowmeter support rim and thus the clamping of the support rim between the flanges on the conduit sections clamps the region where the sensor is supported to provide vibration isolation.

The mounting reduces acceleration sensitivity, and the signal from the sensor accurately represents flow conditions.

What is claimed is:

1. A vortex flowmeter apparatus comprising a support member, a flow obstruction body mounted on said support member and having a first surface portion which faces toward a normal direction of flow to be measured, said flow obstruction body having second surface portions facing laterally to the direction of flow, means on said flow obstruction body defining at least one trip member projecting from the flow facing first surface in a direction at least partially opposite from the normal fluid flow direction, and said trip member being positioned adjacent one of said second laterally facing surface portions, said trip member causing fluid which impinges upon said first surface portion of said flow obstruction body to separate as it impinges on the flow facing surface to start and enhance a swirling tendency in the fluid flow as the fluid flows past the one lateral facing surface portion of the flow obstruction body, and sensing means to sense vibrations of said flow obstruction body caused by formation of vortices around said trip member of said body.

2. The combination of claim 1 wherein said flow obstruction body has a generally symmetrical cross section about a central plane parallel to the direction of normal fluid flow and extending along the longitudinal axis of the flow obstruction body, to thus form a pair of trip members, said trip members each having a cross sectional width and height projecting from adjacent surfaces of said flow obstruction body not substantially greater than 0.10 times the maximum dimension of said flow obstruction body in direction perpendicular to said plane.

3. A flowmeter assembly comprising a support, a flow obstruction body mounted on said support, said flow obstruction body being adapted to be installed into a flow conduit having fluid flowing therethrough, said flow obstruction body having a longitudinal axis and projecting into the normal path of fluid flow, said flow obstruction body having a main portion with a generally symmetrical rectilinear cross section about a plane parallel to the direction of flow through the conduit and lying on the longitudinal axis of said flow obstruction body, said cross section of said flow obstruction body including a first side facing in direction toward intended flow and lateral sides have surfaces generally parallel to the flow direction, a pair of longitudinally extending protuberances forming surface irregularities on opposite side of said plane, said protuberances being positioned adjacent the flow facing side of the flow obstruction body and having a height and width projecting from adjacent portions of the cross section of the main portion of said flow obstruction body not substantially greater than 0.10 times the dimension of the flow obstruction body transverse to said plane to effectively initiate release of stronger vortices from said flow obstruction body than the vortices released from a flow obstruction body of substantially the same size and shape as the main portion of said flow obstruction body without protuberances.

4. The flowmeter of claim 3 wherein the protuberances are of a size which causes any fluid flow following the surface of the flow obstruction body as it flows past the body to change direction of more than ninety degrees as such fluid flows along the flow obstruction body surfaces and around said flow obstruction body.

5. The combination as specified in claim 3 wherein said protuberances comprise projections extending outwardly from the opposite lateral side edges of said flow obstruction body and being positioned with respect to the flow facing surface of said flow obstruction body so that said flow facing surface comprises a generally planar surface extending generally perpendicular to the normal direction of flow, and said flow facing surface defining portions of said protuberances.

6. The flowmeter of claim 3 wherein said support comprises a peripheral member, said flow obstruction body being supported at both of its opposite ends on said peripheral member.

7. The flowmeter of claim 6 wherein said flow obstruction body is formed into two sections, said sections being on a common longitudinal axis and supported at ends adjacent the periphery of the flow conduit, the flow obstruction body sections having facing end surfaces separated by a space sufficiently small to prevent substantial flow between said end surfaces.

8. A flowmeter assembly comprising a support including an annular rim member, said rim member defining a central interior opening through which flow may pass, a flow obstruction body assembly mounted on said rim member and having a longitudinal axis extending transversely across said rim member in position so that fluid flowing through the flow opening of said rim member surrounds said flow obstruction body, said flow obstruction body having a desired cross sectional shape and being mounted to said rim member only at opposite end portions of said flow obstruction body, said flow obstruction body comprising two independent, cantilevered sections formed by a narrow slit in said flow obstruction body, said slit being sufficiently narrow to prevent substantial flow of fluid through said slit.

9. The combination as specified in claim 8 wherein said slit is on the order of 10 mils in width as measured along the longitudinal axis of said flow obstruction body.

10. The combination as specified in claim 8 wherein said flow obstruction body has a cross section shape including a pair of protrusions on the flow facing surface thereof which are small in relation to the cross sectional size of the flow obstruction body and which tend to set up a swirling action of fluid flowing past said flow obstruction body.

11. The flowmeter of claim 8 wherein the longitudinal axis of said flow obstruction body extends along a generally diametral line of said rim.

12. The flowmeter of claim 11 wherein one of said flow obstruction body sections has an opening defined therein extending along the longitudinal axis, and means mounted in said opening to sense vibratory movements of said one section.

13. A flow obstruction body for mounting in a position to intercept fluid flow in a flow conduit, said flow obstruction body having means for mounting the body with respect to said conduit, and having a longitudinal axis and projecting into the normal path of fluid flow in a flow conduit, said flow obstruction body having a main portion with a generally symmetrical cross section about a plane parallel to the direction of flow through a conduit in which the flow obstruction body is mounted and lying along the longitudinal axis of said flow obstruction body, said flow obstruction body including a pair of longitudinally extending protuberances forming surface irregularities on opposite sides of said plane, said protuberances having a height and width projecting from adjacent portions of the cross section of the main portion of said flow obstruction body of sufficient magnitude to effectively initiate release of stronger vortices from said flow obstruction body than vortices released from a flow obstruction body of substantially the same size and shape as the main portion of said flow obstruction body without protuberances, said protuberances being formed so that fluid in the conduit flowing along the fluid facing surface of said flow obstruction body as the fluid flows past the flow obstruction body moves generally laterally to the normal direction of flow as it first impinges on said flow obstruction body, said longitudinally extending protuberances causing any fluid flowing along the flow obstruction body surfaces to at least partially reverse direction from its flow direction immediately prior to flowing past the lateral side surface portions of said flow obstruction body as the fluid resumes flowing in the normal direction of flow through said conduit.

14. A flowmeter assembly of the vortex generating type comprising a support, a flow obstruction body mounted on said support, said flow obstruction body being adapted to be installed into a flow conduit having fluid flowing therethrough, said flow obstruction body having a longitudinal axis and projecting into the normal path of fluid flow, said flow obstruction body having a main portion with a generally symmetrical cross section about a plane parallel to the direction of flow through the conduit and lying on the longitudinal axis of said flow obstruction body, said cross section of the main portion of said flow obstruction body being generally rectilinear, and a concave generally part cylindrical surface defined in the flow facing surface of said flow obstruction body to form relatively sharp edge protuberances projecting toward the direction of flow from the main portion of the flow obstruction body adjacent the lateral side edges thereof, said protuberances having a height from adjacent portions of the flow facing surface of sufficient magnitude to effectively initiate release of stronger vortices from said flow obstruction body than from a flow obstruction body of substantially the same size and shape as the main portion of said flow obstruction body but without any protuberances.

15. A flowmeter assembly comprising a support, a flow obstruction body mounted on said support, said flow obstruction body being adapted to be installed into a flow conduit having fluid flowing therethrough, said flow obstruction body having a longitudinal axis and projecting into the normal path of fluid flow, said flow obstruction body having a main portion with a generally symmetrical cross section about a plane parallel to the direction of flow through the conduit and lying on the longitudinal axis of said flow obstruction body, said cross section of said flow obstruction body including a pair of longitudinally extending protuberances forming surface irregularities on opposite side of said plane, said protuberances having a height and width projecting from adjacent portions of the cross section of the main portion of said body of sufficient magnitude to effectively initiate release of stronger vortices from said flow obstruction body than a flow obstruction body of substantially the same size and shape as the main portion of said flow obstruction body, said flow obstruction body further being symmetrical with respect to a second bisecting plane passing longitudinally through said flow obstruction body and positioned generally perpendicular to the normal flow direction through said conduit, said flow obstruction body thereby having protuberances adjacent both the normal flow facing and downstream portions of said flow obstruction body.

16. A flowmeter assembly comprising a flow obstruction body having means thereon to permit said flow obstruction body to be installed into a flow conduit having fluid flowing therethrough, said flow obstruction body having a longitudinal axis and projecting into the normal path of fluid flow, said flow obstruction body having a main portion with a generally rectilinear symmetrical cross section about a plane parallel to the direction of flow through the conduit and lying on the longitudinal axis of said flow obstruction body, said cross section of said flow obstruction body including a pair of longitudinally extending protuberances forming surface irregularities on opposite side of said plane, said protuberances comprising raised ribs adjacent the lateral side edges of said flow obstruction body projecting from the flow facing surface thereof and extending in direction opposite from normal flow direction, said protuberances having a height and width of sufficient magnitude to effectively initiate release of stronger vortices from said flow obstruction body than a flow obstruction body of substantially the same size and shape as the main portion of said flow obstruction body without such protuberances.

17. For use in a flow conduit having mating annular flanges for clamping conduit sections together end to end, a vortex flowmeter assembly having a peripheral annular rim clamped between the flanges of a conduit when in working position and at least one flow obstruction bar fixedly mounted to the rim and thereby being supported in the fluid flow conduit with said one flow obstruction bar projecting into a fluid stream, said rim and bar forming plate-like assembly having an outer peripheral edge surface which is accesible from the exterior of a conduit when positioned between adjacent flanges of two lengths of such conduit, said flow obstruction bar forming a body around which vortices are formed as a function of flow past said flow obstruction bar, sensor means for sensing vibrations of said flow obstruction bar caused by said formation of vortices including an elongated probe portion, said bar having an elongated bore extending from the edge surface of said peripheral rim in direction longitudinally of said bar, said probe portion being mounted in said bore, second means forming a first generally frusto conical interior surface portion on the interior of said bore in alignment with said rim so that said first generally frusto conical surface is aligned generally between flanges of adjacent conduit sections when the rim is clamped therebetween, the large end of said first frusto conical surface portion being most closely adjacent the outer edge of said rim, third means on said probe portion forming a generally outwardly facing exterior generally frusto conical chuck member mating with said first frusto conical interior surface portion when said elongated probe portion is placed in said bore, and fourth means on the exterior of said rim to hold the mating first and second frusto conical surfaces in contact comprising a threadably adjustable member to permit adjusting the force with which said mating frusto conical surfaces are engaged, major portions of said probe portion being spaced from the surfaces of said bore except in desired locations.

* * * * *